Patented Aug. 2, 1949

2,477,768

UNITED STATES PATENT OFFICE 2,477,768

FOOD ENCASING MATERIAL

Robert K. Remer, Elgin, Ill., assignor to Transparent Package Company, Chicago, Ill., a corporation of Illinois No Drawing. Application January 3, 1949, Serial No. 69,055

16 Claims. (Cl. 99—176)

The present invention relates, generally, to enencasing material such as wrappings, bags, or casing, for artificially colored foodstuffs and methods of coloring the same.

This application is a continuation in part of my prior application Serial No. 42,739, filed August 5, 1948.

The object of the present invention, generally stated, is the provision of encasing material, such as wrappings, bags, or tubular casings, for artificially colored foodstuffs, with the encasing material taking the form of films or foils uniformly impregnated with soluble edible coloring materials which upon contact with foodstuffs receptive thereto transfer substantially uniformly to the entire surface of contact so as to color the same.

An important object of the present invention is the provision of a new and useful method of artificially coloring substantially completely and uniformly the outer surface of an article of foodstuff which comprises encasing such foodstuff article in a permeable film which has been substantially uniformly and completely impregnated with the soluble coloring material receptive by said foodstuff.

Certain other and more specific objects of the invention will, in part, be obvious and will in part appear hereinafter.

For a more complete understanding of the nature and scope of the present invention reference may now be had to the following detailed description thereof wherein a number of specific embodiments of the invention are set forth by way of illustration and to acquaint those skilled in the art with the manner of practicing the invention.

Example I

The invention has been put to extended use in the production of artificially colored, skinless wieners, as fully described in my said copending application Serial No. 42,739. Seamless tubes of regenerated cellulose films are first made in known manner as set forth, for example, in United States Patents Nos. 1,601,686; 1,937,225; 1,997,349; and 2,013,491. While the casings so made are still wet, they are conducted through an aqueous solution of glycerine containing a soluble edible coloring material compatible therewith, such, for example, as a water soluble, edible, coal tar dye. The glycerine serves both to plasticize the regenerated cellulose film and also serves as a carrier or solvent for the dye which uniformly and completely impregnates the film. After leaving the plasticizing and color impregnating bath, the tubular casing may be dried in known manner, as by passage through drying tunnels.

Various modifications may be made in the foregoing method of producing my colored sausage casings for use in the production of skinless wieners. Thus, instead of passing the casings through the color impregnating bath, the coloring material may be applied by spraying, brush coating, padding or by sponge rolls. The color treatment may be effected in a separate operation instead of being combined with the plasticizing step. If desired, colorless, dry sausage casings formed of regenerated cellulose made by known methods, may be impregnated with a soluble coloring material according to one of the methods of application mentioned above.

While glycerine is the presently preferred plasticizer and coloring material carrier for films formed of regenerated cellulose, the glycerine may be wholly or partially replaced by other plasticizers or modifying agents such, as for example, other polyhydric alcohols known to have plasticizing properties (e. g. sorbitol and mannitol) and urea as a modifying agent. Edible, oilsoluble, coloring materials, such as FD & C Red #32, FD & C Yellow #3, FD & C Yellow #4, and FD & C Orange #2, can be used. Vegetable oils and emulsions, such as castor oil, soy bean oil, corn oil or peanut oil may be added to the combined plasticizing and color treating bath. Polyethylene glycol (commercially available as "Carbowax" 4000–6000 series) may be used as a plasticizer in connection with the oil-soluble coloring materials. However, the presently preferred plasticizer for regenerated cellulose film is glycerine since this material has excellent penetrating properties for this film.

Because of pertinent governmental regulations, the soluble coloring materials usually employed include such dyestuffs or coal tar colors as will meet with the approval of the various regulating authorities. Such coloring materials are ordinarily referred to as "certified" colors. For example, the five following coal tar colors, or mixtures thereof, may be suitably used for the present invention:

FD & C Orange I—Monosodium salt of 4-p-sulfophenylazo-1-naphthol.
FD & C Red II (Amaranth)—Tri-sodium salt of 1-(4-sulfo-1-naphthylazo-2-naphthol-3, 6-disulfonic acid.
FD & C Red I (Ponceau 3R)—Disodium salt of 1-pseudocumylazo-2-naphthol-3, 6-disulfonic acid.
FD & C Yellow #5.
FD & C Blue #1.

In the production of self coloring sausage casings for skinless wieners, satisfactory results have been obtained by adding up to 10% by weight of one of the above mentioned certified coal tar dyes to a glycerine plasticizing bath which contains from 1 to 30% by weight of glycerine. After passing through this modified plasticizing bath which, in my process, is also a dyeing bath, the regenerated cellulose casings are handled and dried in the usual manner.

The color impregnated, regenerated cellulose sausage casings produced as above described, after drying may be shirred into short lengths and packaged for distribution to sausage makers. Such sausage casings are handled by the sausage maker in accordance with the familiar and general methods of producing skinless wieners, with the exception that the usual dyeing or coloring operation previously used in the case of colorless casings, is omitted. Briefly, the color impregnated sausage casings are stuffed with sausage emulsion and the coloring material immediately transfers to the color receptive sausage emulsion so as to give the entire surface thereof in contact with the interior of the casing a uniform, but shallow, color. The stuffed casings are then linked or reeled, smoked, cooked, chilled and skinned in known manner, except that no additional coloring is required as indicated above.

The colored, skinless wieners produced through the use of the color impregnated sausage casings described above are superior in quality to colored skinless wieners produced by previous methods, and in addition, utilization of the color impregnated sausage casing permits the sausage maker to eliminate the troublesome and inefficient technique of coloring the skinless wieners which formed a part of the conventional method of production using colorless sausage casings. With respect to improvement in quality, colored skinless wieners produced by use of my color-impregnated sausage casings, are free from undesirable "stick marks" or "smoke stick white" which are associated with colored skinless wieners produced using colorless sausage casings. Thus, the self-coloring or color impregnated sausage casings of the present invention not only serve uniformly and completely to color the skinless wieners, but they permit this coloring operation to be carried out more efficiently and in an approved manner.

*Example II*

A length of colorless sausage casing formed of regenerated cellulose and of known commercial type, was treated with an aqueous solution of FD & C Yellow #5 which contained lemon extract flavor. The film was dried and three lengths were cut from it. One of these lengths was filled with sugar water, a second length was filled with melted hard candy, and the third length was filled with vanilla ice cream mix. Each of the fillings was frozen in the respective lengths of the color treated sausage casing, and it was found that the film could be easily stripped in each case. In the case of the sugared water, a yellow colored, lemon flavored "popsicle" was obtained. The surfaces of the candy and the ice cream were colored yellow. If it is desired to color the candy and the ice cream throughout instead of just on the surface, these two materials can be kneaded in the plastic condition before being frozen, the kneading serving to uniformly distribute the color throughout the material.

*Example III*

A seamless, regenerated cellulose sausage casing was impregnated with FD & C Orange #1 in accordance with the procedure described above in connection with Example I. A length of this color impregnated tubing was filled with a sample of melted white process cheese. The cheese was cooled and it was found that the orange color was uniformly drawn from the colored casing and imparted a uniform orange color to the surface of the cheese.

While the coloring material in this case is water soluble, it was found that the water content of the cheese was sufficient to cause the cheese to be receptive to the transfer of color from the impregnated regenerated cellulose casing. An oil soluble, or fat-water soluble coloring material would have been equally or perhaps more effective in coloring the cheese.

*Example IV*

Samples of each of the following different films were treated with a dye solution containing 0.81 gm. of FD & C Orange I dye per 100 ml. of solution:

1. Naturine (a known sausage casing material made of hide fleshings).
2. Vegetable parchment paper.
3. Regenerated cellulose film containing unmodified cotton linters incorporated therein.
4. Regenerated cellulose film.
5. Natural sheep gut sausage casing.

Each of the samples of the five above films was impregnated with color by a twenty-one second immersion in the coloring solution. The pieces of film were removed from the solution and dried. Each of the pieces of film which was thus uniformly impregnated with the orange coloring material was used to encase a sample of raw meat emulsion. In each instance, it was found that the orange color promptly and uniformly transferred from the film to the surface of the meat.

The foregoing specific examples serve to show that my invention is generally applicable to films which are permeable. That is, films which can be impregnated or permeated with one or more of the following: water, glycerine, alcohol, animal and vegetable fats and oils, waxes and paraffins. Some films, e. g., regenerated cellulose, are permeable with respect to both aqueous liquids and oily or greasy liquids. In such cases, these films may be impregnated with either water soluble or oil soluble coloring materials, which may be used alone for impregnation or which may be incorporated with a carrier such as glycerine or one of the plasticizers mentioned in Example I above.

The soluble coloring materials with which the different types of films are impregnated or treated, do not serve permanently to color or dye the films. In most instances practically all of the coloring material may be dissolved out of the films leaving the film in its original condition with respect to the color thereof.

A good many foodstuffs have good receptivity for both water soluble and oil soluble coloring material. Some foodstuffs exhibit a better receptivity for one type of coloring material over another. However, there is a rather large number of approved coloring materials of the proper type of solubility and which are edible, so that foodstuffs generally may be colored in accordance with the present invention.

Among the natural coloring materials which may be used, as distinguished from the dyestuffs or coal tar dyes, there may be included such natural coloring materials as alkanet, annatteo, carotene, cochineal, green chlorophyll, saffron and turmeric. If desired, mixtures of two or more coal tar dyes or natural coloring materials may be used, with or without including such harmless inert materials as common salt or sugar. Although for many applications and uses it is advantageous to have the color impregnated films of the present invention in the form of continuous tubes, it will be understood that such films also may take the form of a wide variety of wrapping, bags or casings in accordance with the demands and needs of any particular instance. In many cases it is desirable to strip the films from the finished articles, as in the case of colored skinless wieners. However, if desired, the films may be left in place on the articles.

It will be understood that the foregoing specific embodiments of the invention are given by way of illustration and not by way of limitation and that the scope of the invention is to be measured by the appended claims. In view of the specific embodiments disclosed above, those skilled in the art will be able to make a number of other specific embodiments of the invention.

What I claim as new is:

1. Encasing material for artificially coloring foodstuffs comprising a permeable film substantially uniformly and completely impregnated with a soluble coloring material adapted uniformly to transfer to and color the film contacting surface of foodstuff encased therein and receptive to said coloring material.

2. Encasing material for artificially coloring foodstuffs comprising a permeable cellulosic base film substantially uniformly and completely impregnated with a soluble edible coloring material adapted uniformly to transfer to and color the film contacting surface of foodstuff encased therein and resceptive to said coloring material.

3. Encasing material for artificially coloring foodstuffs comprising a permeable protein base film substantially uniformly and completely impregnated with a soluble edible coloring material adapted uniformly to transfer to and color the film contacting surface of foodstuff encased therein and receptive to said coloring material.

4. Encasing material for artificially coloring foodstuffs comprising naturine film substantially uniformly and completely impregnated with a soluble edible coloring material adapted uniformly to transfer to and color the film contacting surface of foodstuff encased therein and receptive to said coloring material.

5. Encasing material for artificially coloring foodstuffs comprising an animal gut sausage casing substantially uniformly and completely impregnated with a soluble edible coloring material adapted uniformly to transfer to and color the film contacting surface of foodstuff encased therein and receptive to said coloring material.

6. The encasing material of claim 1 wherein said soluble edible coloring material is a coal tar dye.

7. The encasing material of claim 2 wherein said soluble edible coloring material is a coal tar dye.

8. The encasing material of claim 3 wherein said soluble edible coloring material is a coal tar dye.

9. The encasing material of claim 4 wherein said soluble edible coloring material is a coal tar dye.

10. The encasing material of claim 5 wherein said soluble edible coloring material is a coal tar dye.

11. The encasing material of claim 1 wherein said soluble edible coloring material is a natural coloring material.

12. The encasing material of claim 2 wherein said soluble edible coloring material is a natural coloring matter.

13. The encasing material of claim 3 wherein said soluble edible coloring material is a natural coloring matter.

14. The encasing material of claim 4 wherein said soluble edible coloring material is a natural coloring matter.

15. The encasing material of claim 5 wherein said soluble edible coloring material is a natural coloring matter.

16. The method of artificially coloring substantially uniformly and completely the surface of a foodstuff which comprises encasing the foodstuff in a permeable film substantially uniformly and completely impregnated with a soluble coloring material receptive by said foodstuff.

ROBERT K. REMER.

No references cited.